US009991663B2

(12) United States Patent
Murakoshi (10) Patent No.: US 9,991,663 B2
(45) Date of Patent: Jun. 5, 2018

(54) SOLID-STATE LASER DEVICE (71) Applicant: FUJIFILM Corporation, Tokyo (JP)

(72) Inventor: Dai Murakoshi, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 0 days. days.

(21) Appl. No.: 15/470,197

(22) Filed: Mar. 27, 2017

(65) Prior Publication Data

US 2017/0201058 A1   Jul. 13, 2017

Related U.S. Application Data (63) Continuation of application No. PCT/JP2015/004419, filed on Aug. 31, 2015.

(30) Foreign Application Priority Data

Sep. 30, 2014 (JP) .................... 2014-200180

(51) Int. Cl.
H01S 3/042 (2006.01)
H01S 3/093 (2006.01)

(52) U.S. Cl.
CPC ............ *H01S 3/042* (2013.01); *H01S 3/093* (2013.01)

(58) Field of Classification Search
CPC .................................. H01S 3/042; H01S 3/093
See application file for complete search history.

(56) References Cited

U.S. PATENT DOCUMENTS 4,032,862 A * 6/1977 Huchital ............... H01S 3/093
313/570

4,445,217 A * 4/1984 Acharekar ............ H01S 3/042
372/33
4,935,938 A    6/1990 Gressly et al.

FOREIGN PATENT DOCUMENTS

| JP | 51-020690 A | 2/1976 |
| JP | 57-136381 A | 8/1982 |
| JP | 63-228781 A | 9/1988 |
| JP | 2-001188 A | 1/1990 |
| JP | 10-190094 A | 7/1998 |

(Continued)

OTHER PUBLICATIONS

International Search Report (PCT/ISA/210) issued in PCT/JP2015/004419, dated Dec. 22, 2015.

(Continued)

*Primary Examiner* — Dung Nguyen
(74) *Attorney, Agent, or Firm* — Birch, Stewart, Kolasch & Birch, LLP (57) ABSTRACT

A solid-state laser device includes: a first water tank which houses a laser rod and a lamp and into which coolant is introduced; an outer inlet which is provided in a member forming a chamber and through which coolant is received into the chamber; and an outer outlet provided in said member and through which a coolant is discharged to the outside of the chamber. The solid-state laser device further includes: two second water tanks that house electrodes of both ends of the lamp, respectively, and communicate with the first water tank; a coolant inflow passage of which one end communicates with the outer inlet and the other end forms inner inlets opened to only the second water tanks; and a coolant outflow passage of which one end communicates with the outer outlet and the other end forms an inner outlet opened to the first water tank.

20 Claims, 10 Drawing Sheets

(56) References Cited

FOREIGN PATENT DOCUMENTS

| JP | 11-074586 A | 3/1999 |
|---|---|---|
| JP | 11-186637 A | 7/1999 |

OTHER PUBLICATIONS

Written Opinion (PCT/ISA/237) issued in PCT/JP2015/004419, dated Dec. 22, 2015.

\* cited by examiner

A-A CROSS-SECTION

FIG. 3

B-B CROSS-SECTION

FIG. 4
C-C CROSS-SECTION

FIG. 5
D-D CROSS-SECTION

FIG. 6
E-E CROSS-SECTION

FIG. 7

F-F CROSS-SECTION

SOLID-STATE LASER DEVICE

CROSS REFERENCE TO RELATED APPLICATIONS

The present application is a Continuation of PCT International Application No. PCT/JP2015/004419 filed on Aug. 31, 2015, which claims priority under 35 U.S.C. §119(a) to Japanese Patent Application No. 2014-200180 filed on Sep. 30, 2014. Each of the above applications is hereby expressly incorporated by reference, in its entirety, into the present application.

BACKGROUND OF THE INVENTION

1. Field of the Invention

The present invention relates to a solid-state laser device, and more particularly, to a solid-state laser device of which a laser rod and an pumping lamp are housed in a chamber.

2. Description of the Related Art

Various solid-state laser devices of which a laser rod and an pumping lamp are housed in a chamber have been publicly known in the past, and JP1998-190094A (JP-H10-190094A) and JP1988-228781A (JP-S63-228781A) disclose examples of those kinds of solid-state laser devices.

Each of the solid-state laser devices disclosed in JP1998-190094A (JP-H10-190094A) and JP1988-228781A (JP-S63-228781A) is basically a solid-state laser device including a rod-like laser rod and a laser rod pumping lamp that is formed in the shape of a straight pipe and includes electrode portions provided at both ends thereof, and the laser rod and the laser rod pumping lamp are disposed in a chamber in a state in which the major axis of the laser rod and the major axis of the laser rod pumping lamp are parallel to each other and the laser rod and the lamp line up with a gap.

Since the laser rod pumping lamp generates heat and the temperature of the laser rod irradiated with light emitted from the lamp also rises, both the laser rod pumping lamp and the laser rod need to be efficiently cooled in the above-mentioned solid-state laser devices. JP1998-190094A (JP-H10-190094A) and JP1988-228781A (JP-S63-228781A) also disclose a structure for cooling the laser rod pumping lamp and the laser rod.

In the cooling structure disclosed in JP1998-190094A (JP-H10-190094A) and JP1988-228781A (JP-S63-228781A), a straight pipe-shaped lamp is provided on the upper side, the rod-like laser rod is provided below the lamp, a coolant is supplied to a coolant passage extending upward from the lower side of the laser rod, the coolant passage is branched into two branch passages, a coolant is supplied to the periphery of the laser rod from the lower branch passage, and a coolant is supplied to the periphery of the lamp from the upper branch passage in parallel with the supply of the coolant to the periphery of the laser rod. Further, the coolants, which have cooled the laser rod and the lamp, join each other in one passage, and return to a heat exchanger, which removes heat from the coolant, or the like.

SUMMARY OF THE INVENTION

However, it is recognized that an effect of cooling the electrode portions, which are provided at both ends of the laser rod pumping lamp and are particularly likely to reach a high temperature, by the cooling structure disclosed in JP1998-190094A (JP-H10-190094A) and JP1988-228781A (JP-S63-228781A) is low.

The invention has been made in consideration of the above-mentioned circumstances, and an object of the invention is to provide a solid-state laser device of which a laser rod and a laser rod pumping lamp are housed in a chamber and which can efficiently cool electrode portions of the lamp.

A solid-state laser device according to the invention comprises: a rod-like laser rod; a laser rod pumping lamp that is formed in the shape of a straight pipe, includes electrode portions provided at both ends thereof, and is disposed in a state in which a major axis of the lamp and a major axis of the laser rod are parallel to each other and the lamp lines up with the laser rod with a gap; a chamber that houses the laser rod and the lamp; a first water tank portion which houses at least a part of each of the laser rod and the lamp and into which a coolant is introduced; an outer inlet portion which is provided in a member forming the chamber at a position on the side of the laser rod opposite to the lamp and through which a coolant is received into the chamber; an outer outlet portion which is provided in the member forming the chamber at a position on the side of the laser rod opposite to the lamp and through which a coolant is discharged to the outside of the chamber; two second water tank portions that house the electrode portions of both the ends of the lamp, respectively, and communicate with the first water tank portion; a coolant inflow passage of which one end communicates with the outer inlet portion and the other end forms inner inlet portions opened to only the second water tank portions; and a coolant outflow passage of which one end communicates with the outer outlet portion and the other end forms an inner outlet portion opened to the first water tank portion.

It is preferable that the coolant inflow passage is formed in a wall member forming the chamber.

Further, in the solid-state laser device of the invention, it is preferable that only one outer inlet portion is provided, the coolant inflow passage is branched into two passages in the wall member of the chamber at a portion thereof that is directed to the other end thereof from one end thereof communicating with the outer inlet portion, and the other end of the coolant inflow passage, which is branched into the two passages, is opened to only the second water tank portions, respectively.

On the other hand, it is preferable that the coolant outflow passage is also formed in the wall member forming the chamber.

Further, it is preferable that the inner inlet portions are opened to the second water tank portions at positions facing at least a part of the electrode portions.

Furthermore, it is preferable that a portion of the chamber, which houses the laser rod, and a portion of the chamber, which houses the lamp, are adapted to be capable of being divided from each other.

Moreover, it is preferable that the outer inlet portion and/or the outer outlet portion is formed in a chamber-bottom-wall member serving as the lowermost member of the chamber during the use of the solid-state laser device.

Further, it is preferable that protruding portions, which protrude in a direction of the major axis of the lamp more than a portion of the chamber forming the first water tank portion, are formed on the laser chamber and the second water tank portions are formed in the protruding portions.

Furthermore, it is preferable that the electrode portions of the lamp protrude to the outside more than end portions of the laser rod in the direction of the major axis of the lamp.

Moreover, it is preferable that a condensing member, which surrounds a part of each of the laser rod and the lamp, is provided in the first water tank portion.

Further, it is preferable that a gap is formed between an inner wall surface of the first water tank portion and the condensing member.

Furthermore, it is preferable that a portion of the condensing member, which surrounds the laser rod, and a portion of the condensing member, which surrounds the lamp, are adapted to be capable of being divided from each other.

Moreover, the solid-state laser device of the invention may further comprise a tubular flow tube that houses a part of the laser rod and/or the lamp, and a coolant may be introduced into the flow tube.

According to the solid-state laser device of the invention, the electrode portions of the lamp can be efficiently cooled.

DESCRIPTION OF THE PREFERRED EMBODIMENTS

Figure 1:
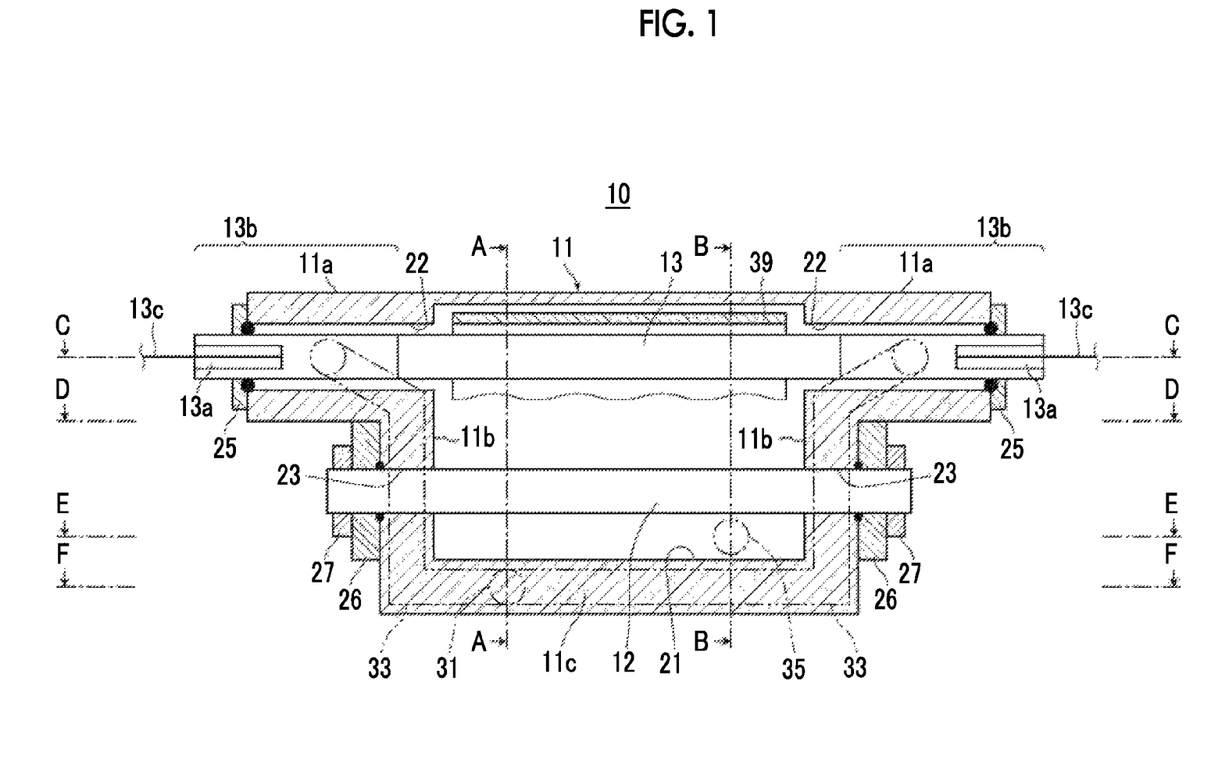
FIG. 1 is a side cross-sectional view of a solid-state laser device according to a first embodiment of the invention.
Figure 2:
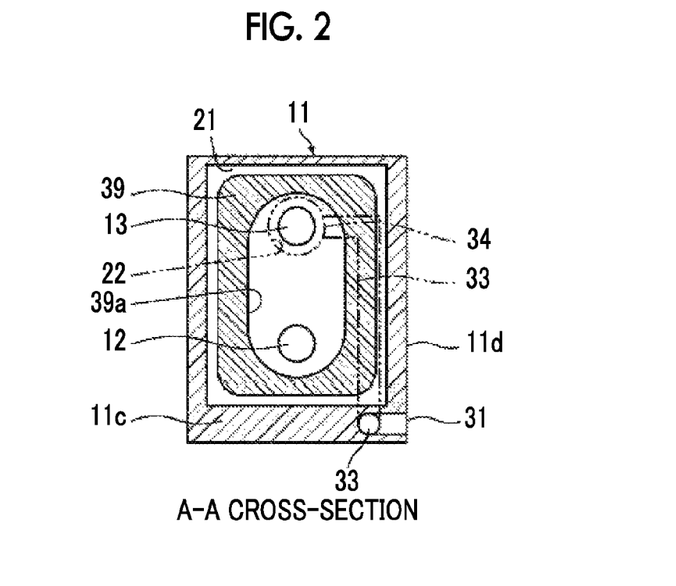
FIG. 2 is a cross-sectional elevational view of the solid-state laser device taken along line A-A of FIG. 1.
Figure 3:
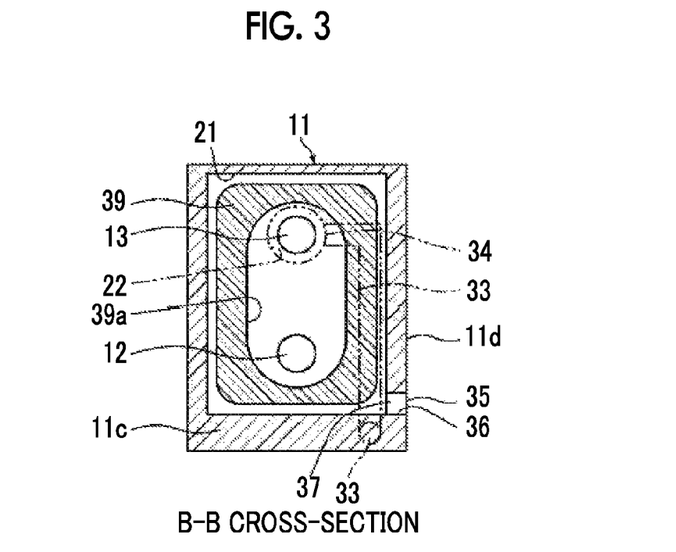
FIG. 3 is a cross-sectional elevational view of the solid-state laser device taken along line B-B of FIG. 1.
Figure 4:
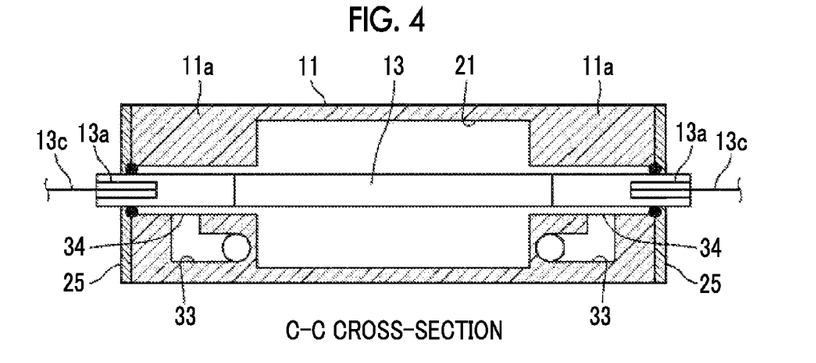
FIG. 4 is a cross-sectional plan view of the solid-state laser device taken along line C-C of FIG. 1.
Figure 5:
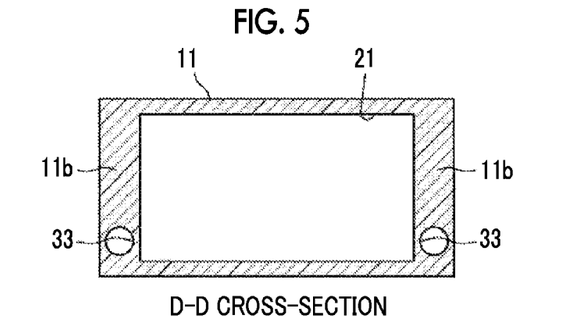
FIG. 5 is a cross-sectional plan view of the solid-state laser device taken along line D-D of FIG. 1.
Figure 6:
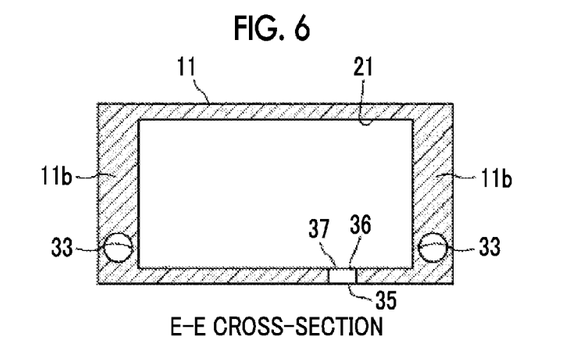
FIG. 6 is a cross-sectional plan view of the solid-state laser device taken along line E-E of FIG. 1.
Figure 7:
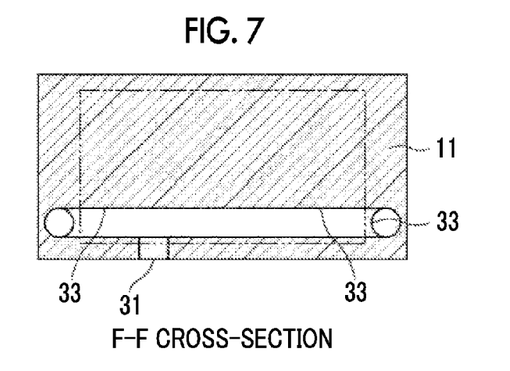
FIG. 7 is a cross-sectional plan view of the solid-state laser device taken along line F-F of FIG. 1.
Figure 8:
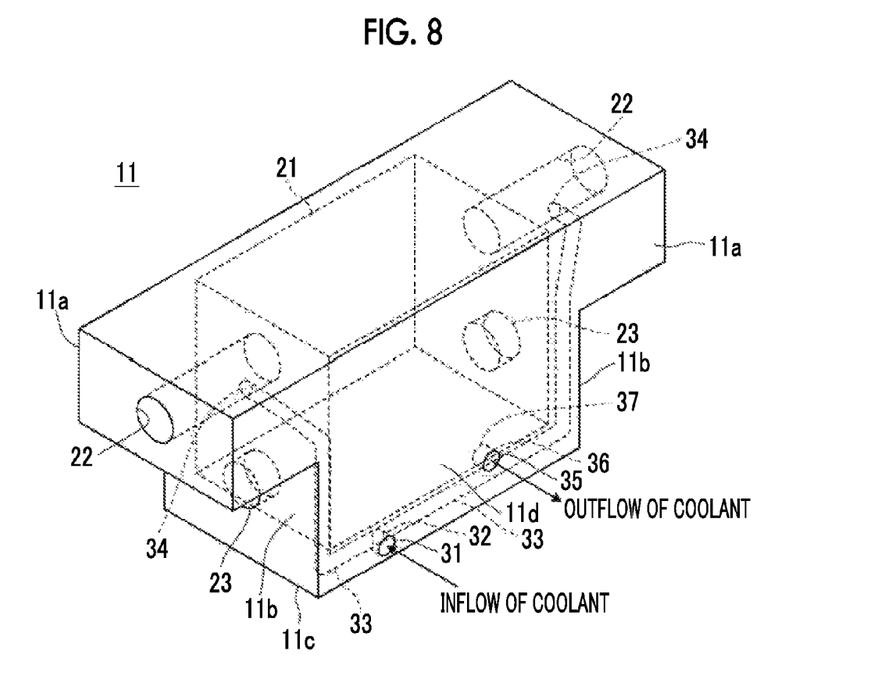
FIG. 8 is a perspective view showing main portions of the solid-state laser device shown in FIG. 1.

Embodiments of the invention will be described in detail below with reference to the drawings. First, a solid-state laser device 10 according to a first embodiment of the invention will be described with reference to FIGS. 1 to 8. FIG. 1 shows the side cross-sectional shape of the solid-state laser device 10, FIG. 2 is a cross-sectional elevational view showing the cross-sectional shape of a portion taken along line A-A of FIG. 1, FIG. 3 is a cross-sectional elevational view showing the cross-sectional shape of a portion taken along line B-B of FIG. 1, FIG. 4 is a cross-sectional plan view showing the cross-sectional shape of a portion taken along line C-C of FIG. 1, FIG. 5 is a cross-sectional plan view showing the cross-sectional shape of a portion taken along line D-D of FIG. 1, FIG. 6 is a cross-sectional plan view showing the cross-sectional shape of a portion taken along line E-E of FIG. 1, FIG. 7 is a cross-sectional plan view showing the cross-sectional shape of a portion taken along line F-F of FIG. 1, and FIG. 8 is a perspective view of a laser chamber of the solid-state laser device 10. Unnecessary portions are appropriately omitted in FIGS. 4 to 7. Further, a lateral direction in FIG. 1 will be referred to as the lateral direction of the solid-state laser device 10 in the following description.

As shown in FIG. 1, the solid-state laser device 10 includes a laser chamber 11, a rod-like laser rod (solid-state laser medium) 12 of which a part is housed in the laser chamber 11, and a flash lamp 13 which is formed in the shape of a straight pipe as a whole and of which a part is housed in the laser chamber 11. The flash lamp 13 is disposed in a state in which the major axis of the flash lamp 13 and the major axis of the laser rod 12 are parallel to each other and the flash lamp 13 lines up with the laser rod 12 with a gap.

The laser rod 12 and the flash lamp 13 may be disposed in a state in which an angle within a certain range is formed between the major axis of the laser rod 12 and the major axis of the flash lamp 13, that is, a state close to a state in which the major axis of the laser rod 12 and the major axis of the flash lamp 13 are parallel to each other, other than a state in which the major axis of the laser rod 12 and the major axis of the flash lamp 13 are exactly parallel to each other. In this specification, it is regarded that such a state is also included in a state in which "the major axis of the laser rod 12 and the major axis of the flash lamp 13 are parallel to each other".

As also clearly shown in FIG. 8, the laser chamber 11 includes a first water tank portion 21 that is a substantially rectangular parallelepiped space formed at a central portion thereof. Further, the laser chamber 11 includes protruding portions 11a protruding to the left and right, and a second water tank portion 22, which is a columnar space extending in a horizontal direction, is formed in each of these protruding portions 11a. These second water tank portions 22 communicate with the first water tank portion 21. Furthermore, a columnar rod holding hole 23 into which the laser rod 12 is inserted is formed in each of vertical wall members 11b that are positioned on the left and right sides of the first water tank portion 21 and below the protruding portions 11a.

The laser rod 12 is a member that is made of a solid-state laser crystal, such as alexandrite (Cr: BeAl2O3), neodymium YAG (Nd: YAG), or titanium sapphire (Ti: Al2O3), and is formed in the shape of a rod. The laser rod 12 is not limited to the above-mentioned member, and other members, which are publicly known, may be appropriately used as the laser rod 12.

The flash lamp 13 is an excitation light source that is used to excite the laser rod 12, and includes electrodes 13a formed at both ends thereof. In this specification, portions 13b between both end portions of the lamp where the electrodes 13a are formed and end portions of a light-emitting portion thereof, which are closer to the middle than both the end portions of the lamp, are referred to as electrode portions. Conductive wires 13c are connected to the two electrodes 13a, respectively, and the flash lamp 13 is connected to a light source for lighting through these conductive wires 13c.

In more detail, for example, a xenon flash lamp and the like can be applied as the flash lamp 13. Further, the excitation light source of the solid-state laser device of the invention is not limited to the flash lamp 13, and, for example, a lamp in which a plurality of LEDs (light emitting diodes) are disposed in a transparent straight pipe so as to line up and which is formed in the shape of a rod as a whole, and the like may be applied as the excitation light source.

The flash lamp 13 is disposed in the laser chamber 11 so that the electrode portions 13b are mainly positioned in the second water tank portions 22, respectively, and the light-emitting portion is mainly positioned in the first water tank portion 21. For example, lamp holding members 25 are fitted to both end portions of the flash lamp 13, and, for example, the pair of lamp holding members 25 is screwed to the respective protruding portions 11a. As a result, the flash lamp 13 is housed and fixed in the laser chamber 11. O-rings are disposed at the outer peripheral positions of outer ends of the second water tank portions 22, and each of the lamp holding members 25 is in pressure contact with the protruding portion 11a with the O-ring interposed therebetween. Accordingly, a liquid-tight state is kept between the second water tank portions 22 and the outside of the laser chamber 11. In FIG. 1, these O-rings are schematically shown by black circles.

Left and right end portions of the laser rod 12 are inserted into the rod holding holes 23 of the vertical wall members 11b, portions of the laser rod 12 protruding to the outside from the rod holding holes 23 are held by rod holding members 27, and, for example, these rod holding members 27 are screwed to intermediate members 26. As a result, the laser rod 12 is housed and fixed in the laser chamber 11. O-rings are fitted to the outer peripheral surfaces of the end portions of the laser rod 12, and each of the rod holding members 27 is in pressure contact with the intermediate member 26 with the O-ring interposed therebetween. Accordingly, a liquid-tight state is kept between the inside of the first water tank portion 21 and the outside of the laser chamber 11. These O-rings are also schematically shown in FIG. 1 by black circles.

Here, a structure, which is separate from the above-mentioned structure, may be applied to hold the laser rod 12 and the flash lamp 13. Further, each of the whole laser rod 12 and the whole flash lamp 13 may be housed in the laser chamber 11 or only a part thereof may be housed in the laser chamber 11.

A condensing member 39 is disposed in the first water tank portion 21. Only a part of the upper portion of the condensing member 39 is shown in FIG. 1. As shown in FIGS. 2 and 3, the condensing member 39 is formed so as to surround the laser rod 12 and the flash lamp 13 and a diffusion member, which diffuses and reflects light emitted from the flash lamp 13, is formed in the shape of a layer on the inner wall surface 39a of the condensing member 39. Accordingly, the laser rod 12 is uniformly irradiated with light emitted from the flash lamp 13.

When the laser rod 12 is irradiated with light emitted from the flash lamp 13 in this way, the laser rod 12 is excited and light having a coherent specific wavelength is emitted from the laser rod 12 due to stimulated emission. Resonator mirrors, which resonate light emitted from the laser rod 12, are disposed at positions that deviate from both ends of the laser rod 12 to the outside of the laser rod 12, that is, the left and right sides in FIG. 1. However, since the resonator mirrors are not directly related to the invention, the resonator mirrors are not shown.

Here, the condensing member 39 may be omitted. In this case, it is preferable that a diffusion member is formed in the shape of a layer on a portion of the laser chamber 11 serving as the peripheral wall of the first water tank portion 21.

Next, a structure for cooling the laser rod 12 and the flash lamp 13 will be described. As particularly clearly shown in FIG. 8, one outer inlet portion 31 is opened at a position below the first water tank portion 21 on one side surface of the laser chamber 11. The outer inlet portion 31 is formed on the side surface of a bottom wall member 11c that serves as the lowermost member of the laser chamber 11 during the use of the solid-state laser device 10. The outer inlet portion 31 is opened at a position on the side of the laser rod 12 opposite to the flash lamp 13. Here, "the side-opposite to" means a state in which the flash lamp 13 and the outer inlet portion 31 are positioned outside the laser rod 12 placed in the middle when the laser rod 12, the flash lamp 13, and the outer inlet portion 31 are projected onto a plane including the major axis of the laser rod 12 and the major axis of the flash lamp 13.

A coolant inflow passage, which includes a passage 32 communicating with the outer inlet portion 31 and branch passages 33 as two passages branched from the passage 32, is formed in the laser chamber 11. The passage 32 is formed in the bottom wall member 11c, and is branched into two branch passages 33 formed in the bottom wall member 11c likewise. Each of the branch passages 33 stands up after extending in the bottom wall member 11c, extends in a vertical direction in the vertical wall member 11b, extends in a horizontal direction after obliquely extending in the protruding portion 11a, and is finally opened to only one second water tank portion 22. The opened portions form inner inlet portions 34 that communicate with the second water tank portions 22. That is, one end of the coolant inflow passage, which includes the passage 32 and the branch passages 33, communicates with the outer inlet portion 31, and the other end thereof forms the inner inlet portions 34 that are opened to only the second water tank portions 22.

The electrode portions 13b of the flash lamp 13 protrude to the outside more than the end portions of the laser rod 12 in the direction of the major axis of the lamp. The outer inlet portion 31 is opened to the second water tank portions 22 at positions facing the electrode portions 13b.

Further, one outer outlet portion 35 is opened to one vertical wall member 11d that is disposed at right angles to the two vertical wall members 11b. The outer outlet portion 35 is opened at a position on the side of the laser rod 12 opposite to the flash lamp 13. Here, "the side-opposite to" means a state in which the flash lamp 13 and the outer outlet portion 35 are positioned outside the laser rod 12 placed in the middle when the laser rod 12, the flash lamp 13, and the outer outlet portion 35 are projected onto a plane including the major axis of the laser rod 12 and the major axis of the flash lamp 13.

A coolant outflow passage 36, of which one end communicates with the outer outlet portion 35 and the other end forms an inner outlet portion 37 opened to the first water tank portion 21, is formed in the vertical wall member 11d. The coolant outflow passage 36 is provided at a vertical position where the lower end of the coolant outflow passage 36 corresponds to the lower end of the first water tank portion 21. The outer outlet portion 35 may be provided on the side surface of the laser chamber 11, and may be opened to the bottom of the laser chamber 11, that is, more specifically, the lower surface of the bottom wall member 11c. The same applies to the outer inlet portion 31.

The cooling of the laser rod 12 and the flash lamp 13 having the above-mentioned structure will be described below. A coolant (refrigerant), such as cooling water, sent from a coolant circulation system (not shown) flows into the outer inlet portion 31 as shown in FIG. 8. A coolant is supplied to the outer inlet portion 31 through a pipe, a hose, or the like connected to the outer inlet portion 31. Particularly, the supply of a coolant may be performed in a so-called disposable form without using the circulation system.

A coolant flowing into the outer inlet portion 31 is supplied into the respective two second water tank portions 22, through the passage 32, the branch passages 33, and the inner inlet portions 34. The temperature of the electrode portion 13b of the flash lamp 13 is usually likely to be higher than that of the light-emitting portion. When a coolant is supplied to the second water tank portions 22 housing the electrode portions 13b for the first time, the electrode portions 13b can be efficiently cooled by the coolant of which the temperature does not rise yet.

Further, it is desired to increase the flow rate of a coolant to be supplied to the second water tank portions 22 to increase the cooling efficiency of the electrode portions 13b. Since a coolant is not simultaneously supplied to the second water tank portions 22 and the first water tank portion 21 and is supplied to only the second water tank portions 22 first in this device, the high flow rate of a coolant to be supplied to the second water tank portions 22 is ensured. Accordingly, the electrode portions 13b can be efficiently cooled even in this regard.

The coolant having flowed through the two second water tank portions 22 flows into the first water tank portion 21 next, and cools the light-emitting portion of the flash lamp 13 and the laser rod 12 that are housed in the first water tank portion 21. The condensing member 39 is housed in the first water tank portion 21 in this embodiment, but a coolant flows inside and outside the condensing member 39 and cools the light-emitting portion of the flash lamp 13 and the laser rod 12.

The coolant having flowed through the first water tank portion 21 flows into the coolant outflow passage 36 from the inner outlet portion 37, and flows to the outside of the laser chamber 11 from the outer outlet portion 35. The coolant, which has flowed out, is sent to, for example, a heat exchanger, which is provided in the coolant circulation system, through a pipe, a hose, or the like connected to the outer outlet portion 35. After the heat of the coolant is removed in the heat exchanger by heat exchange, the coolant is supplied to the outer inlet portion 31 again. Alternatively, a coolant may be disposable just as it is without returning to the coolant circulation system as described above.

The laser rod 12 and the flash lamp 13 may be removed from the laser chamber 11 for inspection, maintenance, replacement, or the like. If a coolant remains in the first water tank portion 21 or the second water tank portions 22, the coolant may leak from the laser chamber 11 at this time. However, since the outer inlet portion 31 and the outer outlet portion 35 are positioned below the first water tank portion 21 and the second water tank portions 22 in the vertical direction in a state in which the solid-state laser device 10 according to this embodiment is used, a coolant can be easily drained from the outer inlet portion 31 and the outer outlet portion 35. Accordingly, it is possible to prevent the above-mentioned situation from being caused.

Further, when the coolant inflow passage, which includes the passage 32 and the branch passages 33, and the coolant outflow passage 36 are formed in a member forming the laser chamber 11, the solid-state laser device 10, which has a simple structure without unevenness or the like caused by the passages, can be obtained.

Next, a solid-state laser device 40 according to a second embodiment of the invention will be described with reference to FIGS. 9 and 10. The same elements as the above-mentioned elements of FIGS. 1 to 8 are denoted in FIGS. 9 and 10 by the same reference numerals as those of FIGS. 1 to 8, and the description thereof will be omitted as long as the description thereof is not particularly required (The same applies hereinafter).

Figure 9:
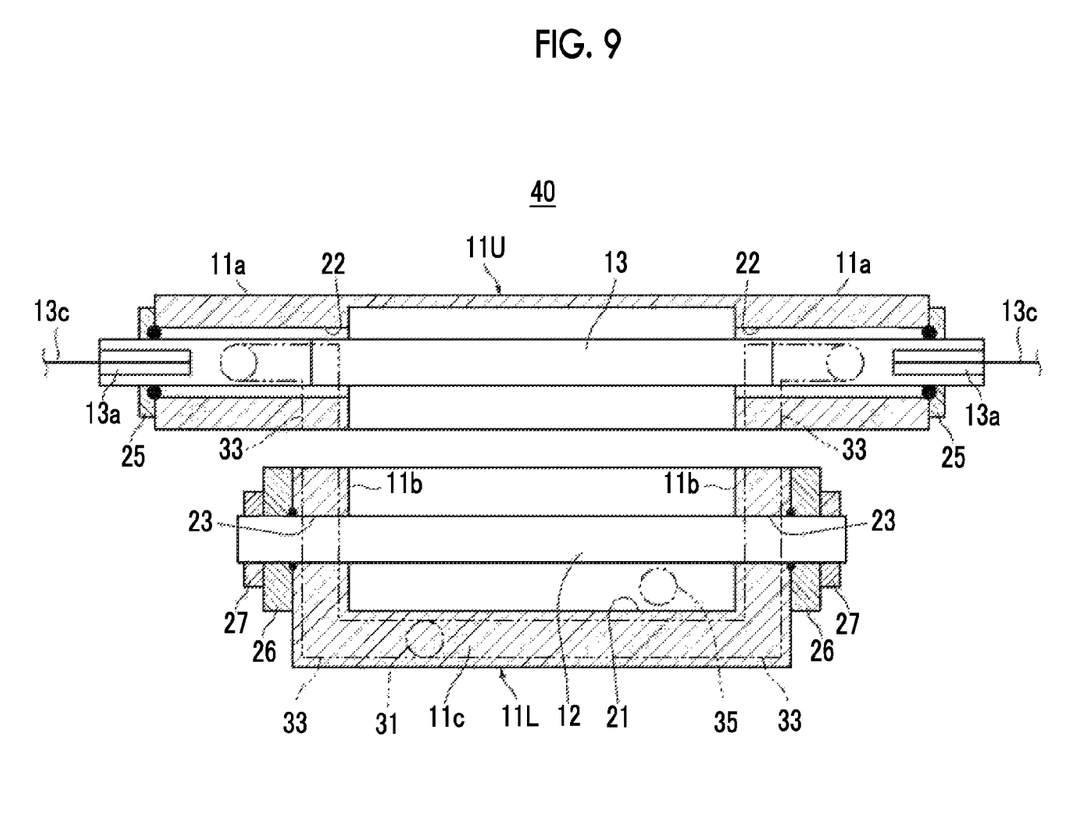
FIG. 9 is a side cross-sectional view of a solid-state laser device according to a second embodiment of the invention.

FIG. 9 shows the side cross-sectional shape of the solid-state laser device 40. The solid-state laser device 40 is basically different from the solid-state laser device 10 according to the above-mentioned first embodiment in that a laser chamber is divided into two laser chambers, that is, upper and lower laser chambers as shown in FIG. 9. That is, in this embodiment, a laser chamber includes an upper laser chamber 11U that houses a flash lamp 13 and a lower laser chamber 11L that is divided from the upper laser chamber 11U. Further, the shapes of the branch passages 33 at portions close to the second water tank portions 22 are partially modified according to the division of both the laser chambers 11U and 11L.

The upper laser chamber 11U and the lower laser chamber 11L are integrated with each other by, for example, screwing or the like. A first water tank portion 21 is formed in each of the upper laser chamber 11U and the lower laser chamber 11L. Accordingly, when the upper and lower laser chambers 11U and 11L are integrated with each other, the respective first water tank portions 21 form one space. Therefore, the same first water tank portion 21 as the first water tank portion 21 of the solid-state laser device 10 according to the first embodiment is formed.

When work, such as the maintenance or inspection of the solid-state laser device 40 or the replacement of the flash lamp 13, is to be performed, the upper and lower laser chambers 11U and 11L are separated from each other. Accordingly, the replacement of the flash lamp 13 or the like can be performed without the deterioration of the alignment of the laser rod 12 that is housed in the lower laser chamber 11L.

Figure 10:
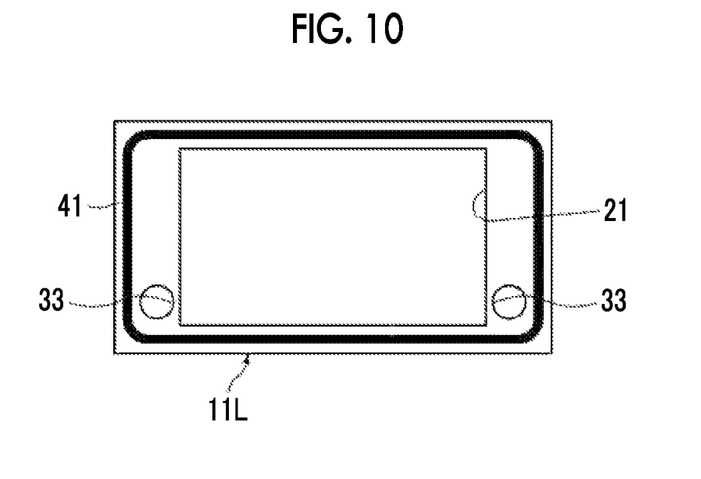
FIG. 10 is a plan view showing a part of the solid-state laser device shown in FIG. 9.

As shown in FIG. 10, an O-ring 41 is provided on the upper surface of the lower laser chamber 11L, which corresponds to the lower surface of the upper laser chamber 11U, so as to surround the first water tank portion 21 and the two branch passages 33 from the outside. Accordingly, since a liquid-tight state is kept between the inside of the O-ring 41 and the outside of the O-ring 41 when the upper and lower laser chambers 11U and 11L are integrated with each other, the leakage of a coolant from the first water tank portion 21 or the branch passages 33 to the outside of the chamber is prevented.

Figure 11:
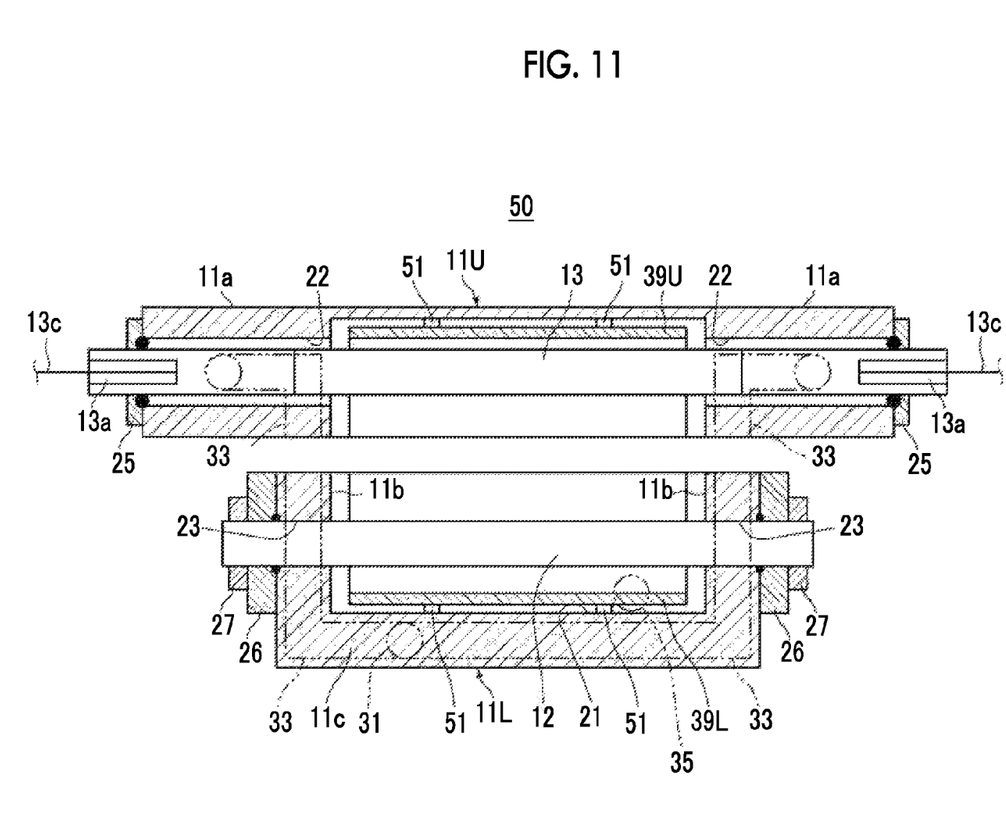
FIG. 11 is a side cross-sectional view of a solid-state laser device according to a third embodiment of the invention.

Next, a solid-state laser device 50 according to a third embodiment of the invention will be described with reference to FIGS. 11 to 13. FIG. 11 shows the side cross-sectional shape of the solid-state laser device 50. The solid-state laser device 50 is basically different from the solid-state laser device 40 according to the above-mentioned second embodiment in that a condensing member is provided as shown in FIG. 11. That is, in this embodiment, a condensing member including an upper condensing member 39U and a lower condensing member 39L, of which the shapes of elevation surfaces are shown in FIG. 13, is provided in the first water tank portion 21.

The condensing member, which includes the upper condensing member 39U and the lower condensing member 39L, has the same function as the function of the condensing member 39 used in the first embodiment. However, in this embodiment, the upper and lower condensing members 39U and 39L can also be separated from each other when the upper and lower laser chambers 11U and 11L are separated from each other. Accordingly, the replacement of the flash lamp 13 or the like can be more easily performed.

Figure 12:
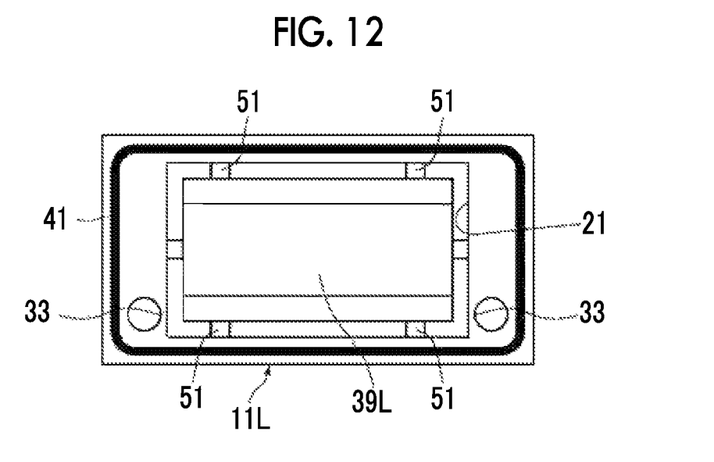
FIG. 12 is a plan view showing a part of the solid-state laser device shown in FIG. 11.
Figure 13:
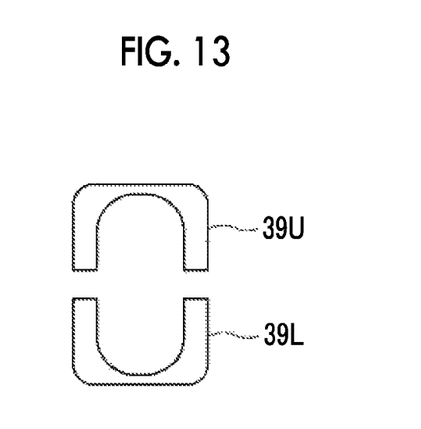
FIG. 13 is an elevational view showing a part of the solid-state laser device shown in FIG. 11.

Further, as shown in FIG. 11 and FIG. 12 showing the planar shape of the lower laser chamber 11L, an appropriate number of spacers 51 are disposed between the outer surfaces of the upper and lower condensing members 39U and 39L and the inner wall surfaces of the upper and lower laser chambers 11U and 11L that form the peripheral wall of the first water tank portion 21. Accordingly, since an appropriate gap is formed between the outer surfaces of the upper and lower condensing members 39U and 39L and the peripheral wall of the first water tank portion 21, a coolant can flow in the gap. As a result, a cooling effect is improved.

Figure 14:
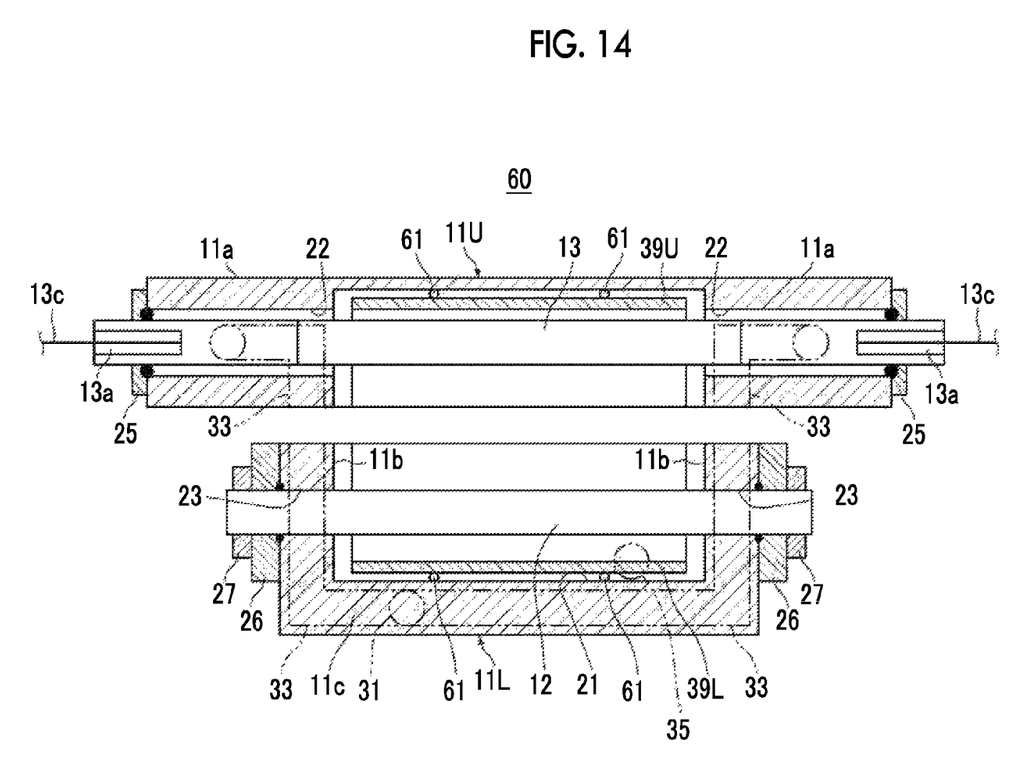
FIG. 14 is a side cross-sectional view of a solid-state laser device according to a fourth embodiment of the invention.
Figure 15:
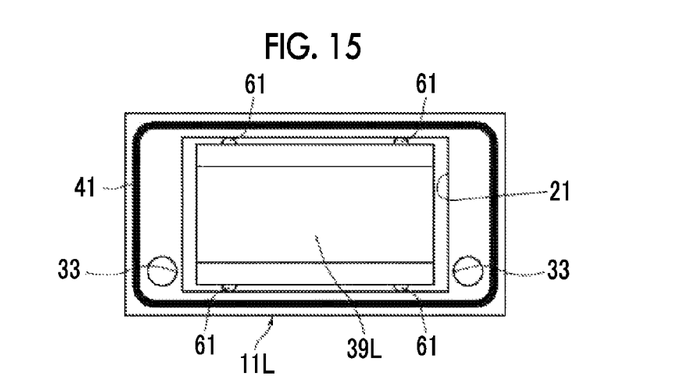
FIG. 15 is a plan view showing a part of the solid-state laser device shown in FIG. 14.

Next, a solid-state laser device 60 according to a fourth embodiment of the invention will be described with reference to FIGS. 14 and 15. FIG. 14 shows the side cross-sectional shape of the solid-state laser device 60, and FIG. 15 shows the planar shape of a lower laser chamber 11L.

The solid-state laser device 60 is basically different from the solid-state laser device 50 according to the above-mentioned third embodiment in terms of a structure related to the holding of the condensing member. That is, in this embodiment, an appropriate number of protrusions 61 are formed on the outer surfaces of the upper and lower condensing members 39U and 39L. Accordingly, since an appropriate gap is formed between the outer surfaces of the upper and lower condensing members 39U and 39L and the peripheral wall of the first water tank portion 21, a coolant can flow in the gap. As a result, a cooling effect is improved.

Figure 16:
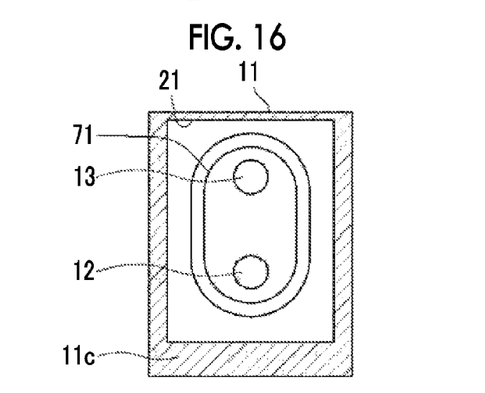
FIG. 16 is a cross-sectional elevational view of a modification of the solid-state laser device of the invention.

In the solid-state laser device of the invention, a flow tube 71, which houses the laser rod 12 and the flash lamp 13, is disposed in the first water tank portion 21 and a coolant may be made to flow in the flow tube 71 as shown in FIG. 16. In this case, a coolant may also be made to flow outside the flow tube 71.

Figure 17:
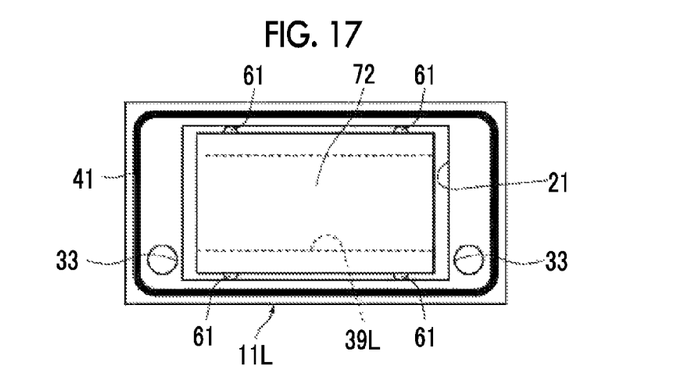
FIG. 17 is a plan view showing the modification of the solid-state laser device of the invention.

Further, it is preferable that a UV cut filter 72, which cuts ultraviolet light included in excitation light emitted from the flash lamp 13, is disposed between the laser rod 12 and the flash lamp 13 in the solid-state laser device of the invention. In a case in which, for example, the above-mentioned upper and lower laser chambers 11U and 11L and the above-mentioned upper and lower condensing members 39U and 39L are applied, it is preferable that the UV cut filter 72 is disposed on the lower condensing member 39L as shown in FIG. 17 and is interposed and fixed between the upper condensing member 39U (not shown), which is provided on the UV cut filter 72, and the lower condensing member 39L.

Since the above-mentioned UV (ultraviolet) cut filter 72 is provided, it is possible to suppress so-called solarization in which the laser rod 12 is discolored by ultraviolet light included in excitation light.

The invention has been described above on the basis of preferred embodiments thereof. However, the solid-state laser device of the invention is not limited to the above-mentioned embodiments and embodiments, which are modified in various ways from the structures of these embodiments, are also included in the scope of the invention.

What is claimed is:

1. A solid-state laser device comprising:
   a rod-like laser rod;
   a laser rod pumping lamp that is formed in the shape of a straight pipe, includes electrode portions provided at both ends thereof, and is disposed in a state in which a major axis of the lamp and a major axis of the laser rod are parallel to each other and the lamp lines up with the laser rod with a gap;
   a chamber that houses the laser rod and the lamp;
   a first water tank portion which houses at least a part of each of the laser rod and the lamp and into which a coolant is introduced;
   an outer inlet portion which is provided in a member forming the chamber at a position on the side of the laser rod opposite to the lamp and through which a coolant is received into the chamber;
   an outer outlet portion which is provided in the member forming the chamber at a position on the side of the laser rod opposite to the lamp and through which a coolant is discharged to the outside of the chamber;
   two second water tank portions that house the electrode portions of both the ends of the lamp, respectively, and communicate with the first water tank portion;
   a coolant inflow passage of which one end communicates with the outer inlet portion and the other end forms inner inlet portions opened to only the second water tank portions; and
   a coolant outflow passage of which one end communicates with the outer outlet portion and the other end forms an inner outlet portion opened to the first water tank portion.

2. The solid-state laser device according to claim 1, wherein the coolant inflow passage is formed in a wall member forming the chamber.

3. The solid-state laser device according to claim 2, wherein only one outer inlet portion is provided, the coolant inflow passage is branched into two passages in the wall member at a portion thereof that is directed to the other end thereof from one end thereof communicating with the outer inlet portion, and the other end of the coolant inflow passage, which is branched into the two passages, is opened to only the second water tank portions, respectively.

4. The solid-state laser device according to claim 1, wherein the coolant outflow passage is formed in the wall member forming the chamber.

5. The solid-state laser device according to claim 2, wherein the coolant outflow passage is formed in the wall member forming the chamber.

6. The solid-state laser device according to claim 1, wherein the inner inlet portions are opened to the second water tank portions at positions that face at least a part of the electrode portions.

7. The solid-state laser device according to claim 2, wherein the inner inlet portions are opened to the second water tank portions at positions that face at least a part of the electrode portions.

8. The solid-state laser device according to claim 1, wherein a portion of the chamber, which houses the laser rod, and a portion of the chamber, which houses the lamp, are adapted to be capable of being divided from each other.

9. The solid-state laser device according to claim 2, wherein a portion of the chamber, which houses the laser rod, and a portion of the chamber, which houses the lamp, are adapted to be capable of being divided from each other.

10. The solid-state laser device according to claim 1, wherein the outer inlet portion and/or the outer outlet portion is formed in a chamber-bottom-wall member that serves as the vertically lowermost member of the chamber during the use of the solid-state laser device.

11. The solid-state laser device according to claim 2, wherein the outer inlet portion and/or the outer outlet portion is formed in a chamber-bottom-wall member that serves as the vertically lowermost member of the chamber during the use of the solid-state laser device.

12. The solid-state laser device according to claim 1, wherein protruding portions, which protrude in a direction of the major axis of the lamp more than a portion of the chamber forming the first water tank portion, are formed on the laser chamber, and the second water tank portions are formed in the protruding portions.

13. The solid-state laser device according to claim 2, wherein protruding portions, which protrude in a direction of the major axis of the lamp more than a portion of the chamber forming the first water tank portion, are formed on the laser chamber, and the second water tank portions are formed in the protruding portions.

14. The solid-state laser device according to claim 1, wherein the electrode portions of the lamp protrude to the outside more than end portions of the laser rod in the direction of the major axis of the lamp.

15. The solid-state laser device according to claim 2, wherein the electrode portions of the lamp protrude to the outside more than end portions of the laser rod in the direction of the major axis of the lamp.

16. The solid-state laser device according to claim 1, wherein a condensing member, which surrounds a part of each of the laser rod and the lamp, is provided in the first water tank portion.

17. The solid-state laser device according to claim 16, wherein a gap is formed between an inner wall surface of the first water tank portion and the condensing member.

18. The solid-state laser device according to claim 16, wherein a portion of the condensing member, which surrounds the laser rod, and a portion of the condensing member, which surrounds the lamp, are adapted to be capable of being divided from each other.

19. The solid-state laser device according to claim 17, wherein a portion of the condensing member, which surrounds the laser rod, and a portion of the condensing member, which surrounds the lamp, are adapted to be capable of being divided from each other.

20. The solid-state laser device according to claim 1, further comprising:
a tubular flow tube that houses a part of the laser rod and/or the lamp,
wherein a coolant is introduced into the flow tube.

* * * * *